US008850916B2

(12) United States Patent
Weingartz et al.

(10) Patent No.: US 8,850,916 B2
(45) Date of Patent: Oct. 7, 2014

(54) METHOD OF CONTROLLING A SYNCHRONIZER ACTUATOR FORK OF A TRANSMISSION

(75) Inventors: Christopher Jay Weingartz, Holly, MI (US); Matthew D. Whitton, Howell, MI (US); Steven P. Moorman, Dexter, MI (US); Matthew Kempeinen, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 13/540,661

(22) Filed: Jul. 3, 2012

(65) Prior Publication Data

US 2014/0007727 A1   Jan. 9, 2014

(51) Int. Cl.
  *F16H 35/00* (2006.01)

(52) U.S. Cl.
  USPC .......................................... 74/335; 192/85.63

(58) Field of Classification Search
  CPC ..... B60W 10/10; B60W 30/19; B60W 10/11; B60W 10/113; B60W 2710/023; B60W 2710/0661; B60K 2741/225; B60K 6/547; B60K 2741/085; B60K 41/222; F16H 2306/48; F16H 1/0437; F16H 2061/2823; F16H 63/502; F16H 61/0403; F16H 2061/0087; F16D 2500/1026
  USPC ........................ 74/335, 346, 339; 701/51–68; 192/85.56, 85.57, 85.63
  See application file for complete search history.

(56) References Cited

U.S. PATENT DOCUMENTS

| | | | | |
|---|---|---|---|---|
| 6,619,152 | B2 * | 9/2003 | Ochi et al. | 74/335 |
| 7,706,949 | B2 * | 4/2010 | Sah et al. | 701/51 |
| 2005/0133334 | A1 * | 6/2005 | Whitton et al. | 192/85 R |
| 2006/0178244 | A1 * | 8/2006 | Whitton et al. | 477/181 |
| 2011/0252910 | A1 * | 10/2011 | Weingartz et al. | 74/473.1 |
| 2011/0257855 | A1 * | 10/2011 | Weingartz et al. | 701/58 |
| 2011/0257857 | A1 * | 10/2011 | Weingartz et al. | 701/68 |
| 2012/0137806 | A1 * | 6/2012 | Moorman et al. | 74/340 |
| 2012/0138408 | A1 * | 6/2012 | Moorman et al. | 192/48.601 |
| 2012/0138413 | A1 * | 6/2012 | Moorman et al. | 192/85.62 |
| 2012/0145502 | A1 * | 6/2012 | Moorman et al. | 192/3.58 |
| 2012/0145503 | A1 * | 6/2012 | Moorman et al. | 192/3.58 |
| 2012/0145504 | A1 * | 6/2012 | Moorman et al. | 192/3.58 |
| 2013/0018556 | A1 * | 1/2013 | Williams et al. | 701/60 |
| 2014/0007727 | A1 * | 1/2014 | Weingartz et al. | 74/473.11 |

* cited by examiner

*Primary Examiner* — Troy Chambers
*Assistant Examiner* — Valentin Craciun
(74) *Attorney, Agent, or Firm* — Quinn Law Group, PLLC

(57) ABSTRACT

A method of adjusting a pressure signal to an actuator piston to control movement of a synchronizer actuator fork of a transmission includes moving the synchronizer actuator fork from a start position into a target position by applying an initial fluid pressure value. The time required to move the synchronizer actuator fork is measured to define a measured actuation time, and compared to a target actuation time. A correction factor is applied to the initial fluid pressure value to define a revised fluid pressure value when the measured actuation time is not within a pre-defined time range of the target actuation time. When the measured actuation time is greater than the pre-defined time range of the target actuation time, the initial fluid pressure value is increased. When the measured actuation time is less than the pre-defined time range of the target actuation time, the initial fluid pressure value is decreased.

20 Claims, 2 Drawing Sheets

METHOD OF CONTROLLING A SYNCHRONIZER ACTUATOR FORK OF A TRANSMISSION

TECHNICAL FIELD

The invention generally relates to a method of controlling a transmission, and more specifically to a method of adjusting a pressure signal to an actuator piston to control movement of a synchronizer actuator fork of the transmission.

BACKGROUND

In vehicular transmissions, such as but not limited to a dual clutch transmission, synchronizers are used to engage the different gears to achieve the different gear ratios. The synchronizers are moved by a synchronizer actuator fork that slides the synchronizer along a shaft into interlocking engagement with a gear. The timing, position and movement of the synchronizer actuator forks must be precisely controlled to obtain consistent, smooth shifts.

The synchronizer actuator forks may be controlled, for example, by a pressure solenoid that applies a fluid pressure to a first side of an actuator piston, and a flow solenoid disposed in series with the pressure solenoid and controlling fluid flow from a second side of the actuator piston. Movement of the actuator piston moves the synchronizer actuator fork. The magnitude of the fluid pressure applied to the first side of the actuator piston determines how fast the actuator piston moves, and thereby how fast the synchronizer actuator fork moves. An increase in the fluid pressure applied to the first side of the actuator piston increases the speed at which the synchronizer actuator fork moves, thereby decreasing the time required to move the synchronizer actuator fork from a disengaged start position into an engaged target position. In contrast, a decrease in the fluid pressure applied to the first side of the actuator piston decreases the speed at which the synchronizer actuator fork moves, thereby decreasing the time required to move the synchronizer actuator fork from the disengaged start position into the engaged target position.

SUMMARY

A method of controlling a transmission is provided. The method includes moving a synchronizer actuator fork from a disengaged start position into an engaged target position. Movement of the synchronizer actuator fork is controlled by a pressure solenoid applying fluid pressure to a first side of an actuator piston, and a flow solenoid disposed in series with the pressure solenoid and controlling fluid flow from a second side of the actuator piston. The synchronizer actuator fork is moved by applying fluid pressure at an initial fluid pressure value to the first side of the actuator piston. A period of time required to move the synchronizer actuator fork from the disengaged start position into the engaged target position is measured to define a measured actuation time. The measured actuation time is compared to a target actuation time to determine if the measured actuation time is within a pre-defined time range of the target actuation time, less than the pre-defined time range of the target actuation time, or greater than the pre-defined time range of the target actuation time. When the measured actuation time is not within the pre-defined time range of the target actuation time, the initial fluid pressure value is adjusted to define a revised fluid pressure value. The initial fluid pressure value is increased to define the revised fluid pressure value when the measured actuation time is greater than the pre-defined time range of the target actuation time. The initial fluid pressure value is decreased to define the revised fluid pressure value when the measured actuation time is less than the pre-defined time range of the target actuation time. During future synchronizer actuator fork control events, the fluid pressure at the revised fluid pressure value is applied to the first side of the actuator piston to move the synchronizer actuator fork from the disengaged start position into the engaged target position.

A method of adjusting a pressure signal to an actuator piston to control movement of a synchronizer actuator fork of a transmission is also provided. Movement of the synchronizer actuator fork is controlled by a pressure solenoid applying fluid pressure to a first side of the actuator piston, and a flow solenoid disposed in series with the pressure solenoid and controlling fluid flow from a second side of the actuator piston. The method includes moving the synchronizer actuator fork from a disengaged start position into an engaged target position by applying an initial fluid pressure value to the first side of the actuator piston. A period of time required to move the synchronizer actuator fork from the disengaged start position into the engaged target position is measured to define a measured actuation time. The measured actuation time is compared to a target actuation time to determine if the measured actuation time is within a pre-defined time range of the target actuation time, less than the pre-defined time range of the target actuation time, or greater than the pre-defined time range of the target actuation time. A correction factor is applied to the initial fluid pressure value to define a revised fluid pressure value when the measured actuation time is not within the pre-defined time range of the target actuation time. When the measured actuation time is greater than the pre-defined time range of the target actuation time, the initial fluid pressure value is increased to define the revised fluid pressure value. When the measured actuation time is less than the pre-defined time range of the target actuation time, the initial fluid pressure value is decreased to define the revised fluid pressure value.

Accordingly, the fluid pressure of the control signal to the actuator piston is controlled based on the difference between the measured actuation time to move the synchronization fork from the disengaged start position to the engaged target position, and the target actuation time to move the synchronization fork from the disengaged start position to the engaged target position. If the time difference is within the pre-defined time range of the target actuation time, then no correction of the initial fluid pressure value is required. However, if the time difference is outside the pre-defined time range of the target actuation time, then the initial fluid pressure value is either increased or decreased according to a calibration table to bring the measured actuation time within the pre-defined time range, thereby providing consistent movement of the synchronizer actuator fork, which allows for better coordination of clutch movements within the transmission, gear engagements, and gear disengagements.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
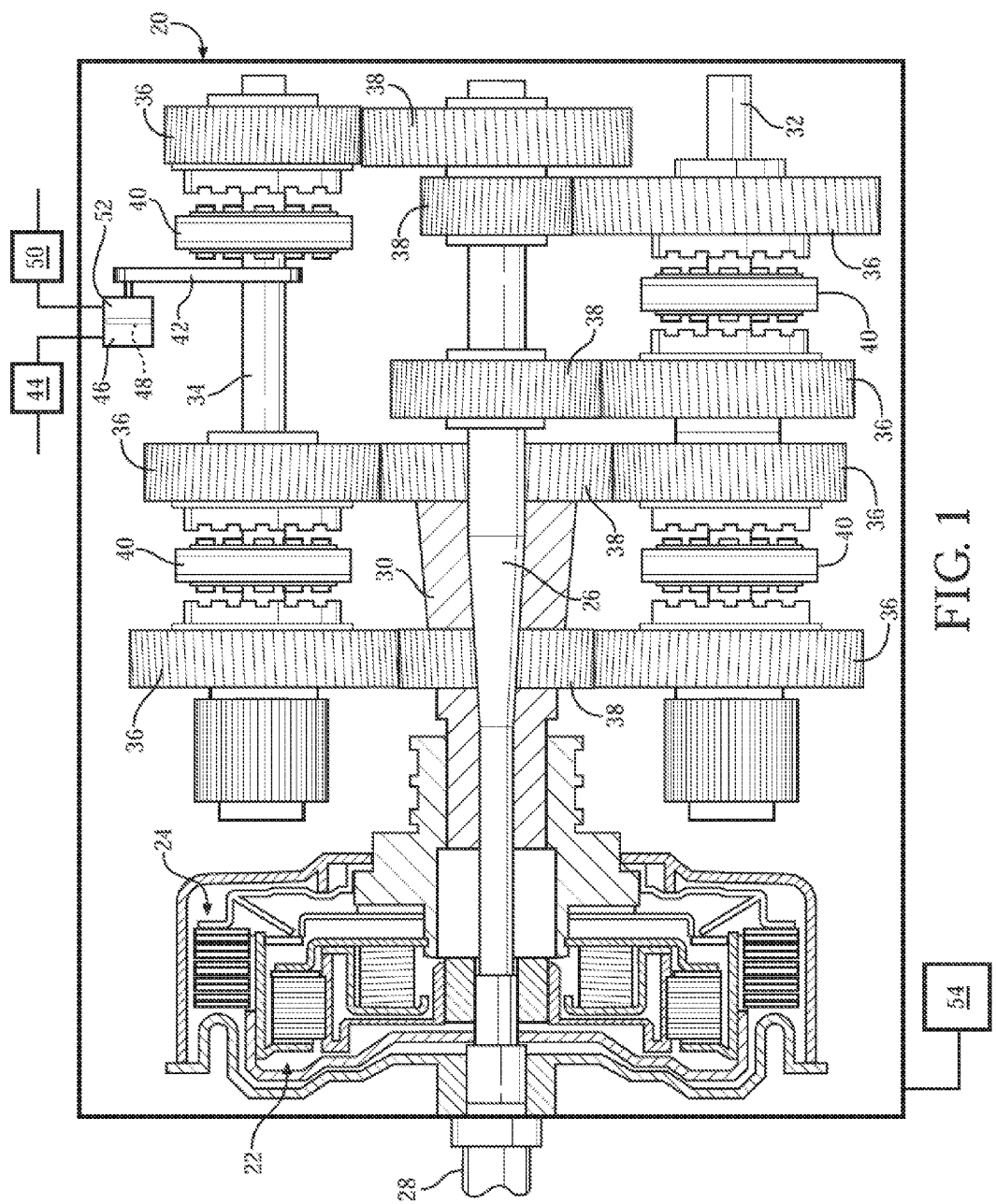
FIG. 1 is a schematic partially cross sectioned top view of a dual clutch transmission.

Referring to the Figures, wherein like numerals indicate like parts throughout the several views, a transmission, hereinafter referred to as a dual clutch transmission, is generally shown at 20 in FIG. 1. While the invention is described relative to the exemplary dual clutch transmission 20 shown in FIG. 1, it should be appreciated that the invention may be utilized with other styles of transmission, not shown or described herein. The dual clutch transmission 20 includes a first clutch 22 and a second clutch 24. The first clutch 22 is coupled to a first transmission shaft 26, and selectively connects the first transmission shaft 26 to an output 28 of an engine (not shown). e.g., a crankshaft. The second clutch 24 is coupled to a second transmission shaft 30, and selectively connects the second transmission shaft 30 to the output 28 of the engine. The first clutch 22 and the second clutch 24 may include, for example, but are not limited to, a wet clutch or a dry clutch. When engaged, the first clutch 22 interconnects the first transmission shaft 26 with the output 28 of the engine to continuously transmit torque therebetween. When disengaged, the first clutch 22 disconnects the first transmission shaft 26 from the output 28 of the engine to disallow torque transmission therebetween. Similarly, when the second clutch 24 is engaged, the second clutch 24 interconnects the second transmission shaft 30 with the output 28 of the engine to continuously transmit torque therebetween. When disengaged, the second clutch 24 disconnects the first transmission shaft 26 from the output 28 of the engine to disallow torque transmission therebetween.

The first transmission shaft 26 may include either an inner transmission shaft or an outer transmission shaft, and the second transmission shaft 30 includes the other of the inner transmission shaft and the outer transmission shaft. The outer transmission shaft defines a hollow core, with the inner transmission shaft disposed therein and concentric with the outer transmission shaft as is known with dual clutch transmissions 20. FIG. 1 shows the first transmission shaft 26 as the inner transmission shaft, and the second transmission shaft 30 as the outer transmission shaft. However, it should be appreciated that the first transmission shaft 26 may alternatively be defined as the outer transmission shaft and the second transmission shaft 30 may be defined as the inner transmission shaft.

The dual clutch transmission 20 includes at least one layshaft. As shown, the dual clutch transmission 20 includes a first layshaft 32 and a second layshaft 34. However, it should be appreciated that the dual clutch transmission 20 need only include one layshaft. Each of the first layshaft 32 and the second layshaft 34 include a plurality of layshaft gears 36 rotatably supported thereon, and in meshing engagement with one of a plurality of transmission shaft gears 38 disposed on one of the first transmission shaft 26 or the second transmission shaft 30.

The dual clutch transmission 20 further includes a plurality of synchronizers 40. Each of the synchronizers 40 rotatably couples at least one of the layshaft gears 36 to one of the first layshaft 32 or the second layshaft 34 for torque transmitting rotation therewith. A shift mechanism, hereinafter referred to as a synchronizer actuator fork 42, moves each of the synchronizers 40 into engagement with one of the layshaft gears 36. It should be appreciated that while only one synchronizer actuator fork 42 is shown for clarity, the dual clutch transmission 20 includes multiple synchronizer actuator forks 42 to move the various synchronizers 40 into and out of engagement. The movement of each of the synchronizer actuator forks 42 is controlled by a pressure solenoid 44, which applies fluid pressure to a first side 46 of the actuator piston 48, and a flow solenoid 50 disposed in series with the pressure solenoid 44, which controls fluid flow from a second side 52 of the actuator piston 48.

The dual clutch transmission 20 may include a control module 54, such as but not limited to a transmission control unit, to control the operation of the dual clutch transmission 20. The control module 54 may include a computer and/or processor, and include all software, hardware, memory, algorithms, connections, sensors, etc., necessary to manage and control the operation of the dual clutch transmission 20. As such, a method of controlling a transmission, such as but not limited to the exemplary dual clutch transmission 20 described herein, may be embodied as a program operable on the control module 54. It should be appreciated that the control module 54 may include any device capable of analyzing data from various sensors, comparing data, making the necessary decisions required to control the operation of the dual clutch transmission 20, and executing the required tasks necessary to control the operation of the dual clutch transmission 20.

In order to get fast responding, smooth operation from the dual clutch transmission 20, the movement of the synchronizers 40 must be consistent and predictable. Accordingly, the method of controlling the transmission described below provides consistent and predictable movement of the synchronizers 40 to ensure quick, smooth shifts. The method adjusts the pressure signal to the actuator piston 48 of a synchronizer actuator fork 42 to control movement of the synchronizer actuator fork 42. While the method is herein described in relation to the dual clutch transmission 20 shown in FIG. 1 and described above, it should be appreciated that the method may be applied to other types of transmissions not shown or described herein.

The method includes providing a control module 54 operable to control the transmission. As noted above, the control module 54 includes all software, hardware, memory, algorithms, connections, sensors, etc. necessary to manage and control the operation of the dual clutch transmission 20. The control module 54 is operable to perform the various tasks of the method described below.

Figure 2:
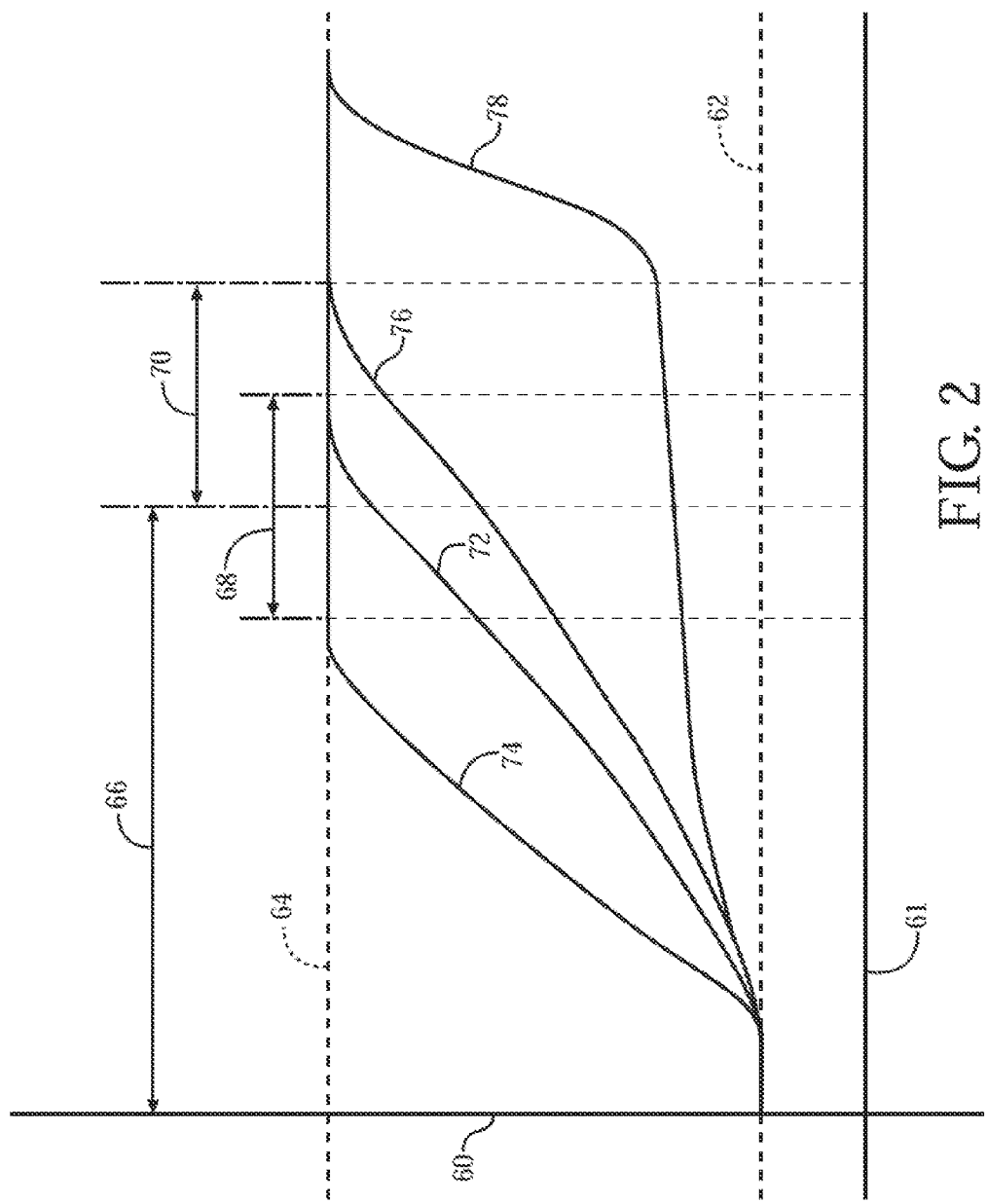
FIG. 2 is a graph relating a position of a synchronizer actuator fork to time.

Referring to FIG. 2, the position of the synchronizer actuator fork 42 is shown along a vertical axis 60, time is shown along a horizontal axis 61, a disengaged start position is represented by line 62, and an engaged target position is represented by line 64. A target actuation time is represented by dimension line 66, a pre-defined time range is represented by dimension line 68, and a maximum time limit is represented by dimension line 70.

The method includes defining the target actuation time 66, and an initial fluid pressure value. The target actuation time 66 is the intended time required to move the synchronizer actuator fork 42 from the disengaged start position 62 into the engaged target position 64. The control module 54 bases many operations of the dual clutch transmission 20, such as engagement or disengagement of one of the first clutch 22 and/or the second clutch 24, on the synchronizer 40 moving into the engaged target position 64 at the target actuation time 66. The initial fluid pressure value is also defined. The initial fluid pressure value is the amount of fluid pressure that the pressure solenoid 44 applies to the first side 46 of the actuator piston 48 to move the synchronizer actuator fork 42. The initial fluid pressure value is intended to move the synchronizer actuator fork 42 from the disengaged start position 62 into the engaged target position 64 in the target actuation time 66. However, due to manufacturing variances, part wear, etc., the actual fluid pressure required to move the synchronizer actuator fork 42 from the disengaged start position 62 into the engaged target position 64 in the target actuation time 66 may vary from the initial fluid pressure value. Accordingly, the below described method provides a strategy to compensate for deviation from the target actuation time 66 in order to provide consistent and predictable operation of the synchronizer 40.

The synchronizer actuator fork 42 is then moved from the disengaged start position 62 into the engaged target position 64 by applying the initial fluid pressure value to the first side 46 of the actuator piston 48. The period of time required to move the synchronizer actuator fork 42 from the disengaged start position 62 into the engaged target position 64 is measured, and defines a measured actuation time, represented by actuation lines 72, 74, 76,78. The time taken to move the synchronizer actuator fork 42 from the disengaged start position 62 into the engaged target position 64 may be measured in any suitable manner, such as but not limited to a timer coupled to the control module 54.

The measured actuation time is compared to the target actuation time 66 to determine if the measured actuation time is within the pre-defined time range 68 of the target actuation time 66, or is not within, i.e., outside, the pre-defined time range 68 of the target actuation time 66. The pre-defined time range 68 is a range of time, i.e., a time variance, before or after the target actuation time 66, in which the measured actuation time may fall and be considered as being within acceptable tolerance. Accordingly, if the measured actuation time is within the pre-defined time range 68 of the target actuation time 66, represented by a first actuation line 72, then the measured actuation time may be considered to be within allowable tolerances, and no correction to the initial fluid pressure value is required. When the measured actuation time is within the pre-defined time range 68 of the target actuation time 66, the initial fluid pressure value may be applied to the first side 46 of the actuator piston 48 during future synchronizer actuator fork 42 control events to move the synchronizer actuator fork 42.

If the measured actuation time is outside of the pre-defined time range 68 of the target actuation time 66, then the measured actuation time may be considered not to be within allowable tolerances, and the initial fluid pressure value may be corrected or modified to bring the measured actuation time within the pre-defined time range 68 of the target actuation time 66. If the measured actuation time is outside the pre-defined time range 68 of the target actuation time 66, then the measured actuation time may be less than the pre-defined time range 68 of the target actuation time 66, such as represented by a second actuation line 74, in which the synchronizer actuator fork 42 is moving too quickly. Alternatively, the measured actuation time may be greater than the pre-defined time range 68 of the target actuation time 66, such as represented by a third actuation line 76, in which the synchronizer actuator fork 42 is moving too slowly.

When the measured actuation time is not within the pre-defined time range 68 of the target actuation time 66, the initial fluid pressure value is adjusted to define a revised fluid pressure value. Adjusting the initial fluid pressure value to define the revised fluid pressure value may include, but is not limited to, applying a correction factor to the initial fluid pressure value to define the revised fluid pressure value. For example, the initial fluid pressure value may be multiplied by a correction factor to define the revised fluid pressure value, or alternatively, a look-up table may be referenced to define the revised fluid pressure value.

When the measured actuation time is less than the pre-defined time range 68 of the target actuation time 66, represented by the second actuation line 74, the initial fluid pressure value is decreased to define the revised fluid pressure value, thereby decreasing the velocity of the synchronizer actuator fork 42 to increase the measured actuation time. Throughout FIG. 2, the velocity of the synchronizer actuator fork 42 is represented by the slope of the various actuation lines. Accordingly, a steeper slope of the actuation lines indicates a higher velocity, whereas a shallow slope of the actuation lines indicates a lower velocity. The magnitude that the initial fluid pressure value is decreased when the measured actuation time is less than the pre-defined time range 68 of the target actuation time 66 is dependent upon the difference between the measured actuation time and the target actuation time 66. The greater the difference between the measured actuation time and the target actuation time 66, the more the initial pressure value is decreased. Accordingly, the magnitude of the change of the initial fluid pressure value decreases as the difference between the measured actuation time and the target actuation time 66 decreases. The magnitude of the change of the initial fluid pressure value increases as the difference between the measured actuation time and the target actuation time 66 increases.

In contrast, when the measured actuation time is greater than the pre-defined time range 68 of the target actuation time 66, represented by the third actuation line 76, the initial fluid pressure value is increased to define the revised fluid pressure value, thereby increasing the velocity of the synchronizer actuator fork 42 to reduce the measured actuation time. The magnitude that the initial fluid pressure value is increased when the measured actuation time is greater than the pre-defined time range 68 of the target actuation time 66 is dependent upon the difference between the measured actuation time and the target actuation time 66. The farther the measured actuation time is from the target actuation time 66, the more the initial pressure value is increased. Accordingly, the magnitude of the change of the initial fluid pressure value increases as the difference between the measured actuation time and the target actuation time 66 increases. The magnitude of the change of the initial fluid pressure value decreases as the difference between the measured actuation time and the target actuation time 66 decreases.

In order to determine when the synchronizer actuator fork 42 is completely moved into the engaged target position 64, the control module 54 may monitor a position of the synchronizer actuator fork 42, and a velocity of the synchronizer actuator fork 42 while the synchronizer actuator fork 42 moves from the disengaged start position 62 into the engaged target position 64. The control module 54 may monitor the position and/or speed of the synchronizer actuator fork 42 in any suitable manner, such as but not limited to with a position sensor or a speed sensor respectively.

When the synchronizer actuator fork 42 has failed to move into the engaged target position 64 within the maximum time limit 70 of the target actuation time 66, and the velocity of the synchronizer actuator fork 42 is less than a minimum velocity, represented by a fourth actuation line 78, then the initial fluid pressure value is continuously increased until the velocity of the synchronizer actuator fork 42 is greater than the minimum velocity. The time to move the synchronizer actuator fork 42 into the engaged target position 64 continues to be measured while the initial fluid pressure value is increased to bring the velocity of the synchronizer actuator fork 42 up to the minimum velocity. The revised fluid pressure value is then dependent upon the magnitude of the increase of the initial fluid pressure value required for the synchronizer actuator fork 42 to achieve the minimum velocity, as well as the measured actuation time.

Once the initial fluid pressure value has been corrected to define the revised fluid pressure value, or the appropriate correction factor has been determined to modify the initial fluid pressure value to define the revised fluid pressure value, then the revised fluid pressure value may be applied to the first side 46 of the actuator piston 48 during future synchronizer actuator fork 42 control events to move the synchronizer actuator fork 42 from the disengaged start position 62 into the engaged target position 64. The revised fluid pressure value should cause the synchronizer actuator fork 42 to move into the engaged target position 64 within the pre-defined time range 68 of the target actuation time 66, thereby providing consistent actuation of the synchronizer 40. While the method described above references modifying the pressure control signal to only a single actuator piston 48 for a single synchronizer actuator fork 42, it should be appreciated that the method may be applied to all of the synchronizer actuator forks 42 of the dual clutch transmission 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a transmission, the method comprising:

moving a synchronizer actuator fork from a disengaged start position into an engaged target position by applying fluid pressure at an initial fluid pressure value to a first side of an actuator piston, wherein movement of the synchronizer actuator fork is controlled by a pressure solenoid applying fluid pressure to the first side of the actuator piston, and a flow solenoid disposed in series with the pressure solenoid and controlling fluid flow from a second side of the actuator piston;

measuring a period of time required to move the synchronizer actuator fork from the disengaged start position into the engaged target position to define a measured actuation time;

comparing the measured actuation time to a target actuation time to determine if the measured actuation time is within a pre-defined time range of the target actuation time, less than the pre-defined time range of the target actuation time, or greater than the pre-defined time range of the target actuation time;

adjusting the initial fluid pressure value to define a revised fluid pressure value when the measured actuation time is not within the pre-defined time range of the target actuation time, wherein the initial fluid pressure value is increased to define the revised fluid pressure value when the measured actuation time is greater than the pre-defined time range of the target actuation time, and wherein the initial fluid pressure value is decreased to define the revised fluid pressure value when the measured actuation time is less than the pre-defined time range of the target actuation time; and applying fluid pressure at the revised fluid pressure value to the first side of the actuator piston to move the synchronizer actuator fork from the disengaged start position into the engaged target position during future synchronizer actuator fork control events.

2. A method as set forth in claim 1 further comprising applying the fluid pressure at the initial fluid pressure value to the first side of the actuator piston during future synchronizer actuator fork control events when the measured actuation time is within the pre-defined time range of the target actuation time.

3. A method as set forth in claim 1 wherein the magnitude of the initial fluid pressure value is increased when the measured actuation time is greater than the pre-defined time range of the target actuation time, and wherein the magnitude that the initial fluid pressure value is increased is dependent upon the difference between the measured actuation time and the target actuation time.

4. A method as set forth in claim 3 wherein the magnitude of change of the initial fluid pressure value increases as the difference between the measured actuation time and the target actuation time increases.

5. A method as set forth in claim 1 wherein the magnitude of the initial fluid pressure value is decreased when the measured actuation time is less than the pre-defined time range of the target actuation time, and wherein the magnitude that the initial fluid pressure value is decreased is dependent upon the difference between the measured actuation time and the target actuation time.

6. A method as set forth in claim 5 wherein the magnitude of change of the initial fluid pressure value decreases as the difference between the measured actuation time and the target actuation time decreases.

7. A method as set forth in claim 1 further comprising measuring a velocity of the synchronizer actuator fork while moving from the disengaged start position into the engaged target position.

8. A method as set forth in claim 7 further comprising continuously increasing the initial fluid pressure value, when the synchronizer actuator fork has failed to move into the engaged target position within a maximum time limit of the target actuation time and the velocity of the synchronizer actuator fork is less than a minimum velocity, until the velocity of the synchronizer actuator fork is greater than the minimum velocity.

9. A method as set forth in claim 8 wherein the magnitude of the increase of the initial fluid pressure value to define the revised fluid pressure value when the synchronizer actuator fork has failed to move into the engaged target position within a maximum time limit of the target actuation time and the velocity of the synchronizer actuator fork is less than a minimum velocity is dependent upon the magnitude of the increase of the initial fluid pressure value required for the synchronizer actuator fork to achieve the minimum velocity.

10. A method as set forth in claim 1 wherein adjusting the initial fluid pressure value to define the revised fluid pressure value is further defined as applying a correction factor to the initial fluid pressure value to define the revised fluid pressure value.

11. A method as set forth in claim 1 further comprising monitoring a position of the synchronizer actuator fork.

12. A method as set forth in claim 1 further comprising defining the initial fluid pressure value for the pressure solenoid to apply to the first side of the actuator piston to move the synchronizer actuator fork.

13. A method as set forth in claim 1 further comprising defining the target actuation time to move the synchronizer actuator fork from the disengaged start position into the engaged target position.

14. A method as set forth in claim 1 further comprising providing a control module operable to:
   control movement of the synchronizer actuator fork from the disengaged start position into the engaged target position;
   measure the time required to move the synchronizer actuator fork from the disengaged start position into the engaged target position;
   determine if the measured actuation time is within a pre-defined time range of the target actuation time, less than the pre-defined time range of the target actuation time, or greater than the pre-defined time range of the target actuation time;
   adjust the initial fluid pressure value to define the revised fluid pressure value; and
   apply the revised fluid pressure value to the first side of the actuator piston during future synchronizer actuator fork control events.

15. A method of adjusting a pressure signal to an actuator piston to control movement of a synchronizer actuator fork of a transmission, wherein movement of the synchronizer actuator fork is controlled by a pressure solenoid applying fluid pressure to a first side of the actuator piston, and a flow solenoid disposed in series with the pressure solenoid and controlling fluid flow from a second side of the actuator piston, the method comprising:
   moving the synchronizer actuator fork from a disengaged start position into an engaged target position by applying fluid pressure at an initial fluid pressure value to the first side of the actuator piston;
   measuring a period of time required to move the synchronizer actuator fork from the disengaged start position into the engaged target position to define a measured actuation time;
   comparing the measured actuation time to a target actuation time to determine if the measured actuation time is within a pre-defined time range of the target actuation time, less than the pre-defined time range of the target actuation time, or greater than the pre-defined time range of the target actuation time; and
   applying a correction factor to the initial fluid pressure value to define a revised fluid pressure value when the measured actuation time is not within the pre-defined time range of the target actuation time, wherein the initial fluid pressure value is increased to define the revised fluid pressure value when the measured actuation time is greater than the pre-defined time range of the target actuation time, and wherein the initial fluid pressure value is decreased to define the revised fluid pressure value when the measured actuation time is less than the pre-defined time range of the target actuation time.

16. A method as set forth in claim 15 further comprising applying fluid pressure at the initial fluid pressure value to the first side of the actuator piston during future synchronizer actuator fork control events when the measured actuation time is within the pre-defined time range of the target actuation time to move the synchronizer actuator fork from the disengaged start position into the engaged target position, and applying fluid pressure at the revised fluid pressure value to the first side of the actuator piston during future synchronizer actuator fork control events when the measured actuation time is not within the pre-defined time range of the target actuation time to move the synchronizer actuator fork from the disengaged start position into the engaged target position.

17. A method as set forth in claim 15 wherein the magnitude of the initial fluid pressure value is increased when the measured actuation time is greater than the pre-defined time range of the target actuation time, and wherein the magnitude that the initial fluid pressure value is increased is dependent upon the difference between the measured actuation time and the target actuation time.

18. A method as set forth in claim 17 wherein the magnitude of change of the initial fluid pressure value increases as the difference between the measured actuation time and the target actuation time increases.

19. A method as set forth in claim 15 wherein the magnitude of the initial fluid pressure value is decreased when the measured actuation time is less than the pre-defined time range of the target actuation time, and wherein the magnitude that the initial fluid pressure value is decreased is dependent upon the difference between the measured actuation time and the target actuation time.

20. A method as set forth in claim 19 wherein the magnitude of change of the initial fluid pressure value decreases as the difference between the measured actuation time and the target actuation time decreases.

* * * * *